No. 701,990. Patented June 10, 1902.
J. B. BELL.
LINOTYPE MACHINE.
(Application filed Nov. 16, 1901.)
(No Model.) 10 Sheets—Sheet 8.

UNITED STATES PATENT OFFICE.

JEROME B. BELL, OF WILMINGTON, DELAWARE.

LINOTYPE-MACHINE.

SPECIFICATION forming part of Letters Patent No. 701,990, dated June 10, 1902.

Application filed November 16, 1901. Serial No. 82,581. (No model.)

*To all whom it may concern:*

Be it known that I, JEROME B. BELL, a citizen of the United States, and a resident of Wilmington, in the county of Newcastle, State of Delaware, have invented certain new and useful Improvements in Linotype-Machines, of which the following is a specification.

My invention relates to that class of linotype-machines in which two or more magazines provided each with its own distributer are arranged to deliver their matrices to the same composing mechanism and are for this purpose combined each with a set of escapement devices adapted to be operated from a single keyboard, whereby matrices can be delivered at will from one magazine to the other. A line of matrices set up in such a machine may be composed of an assortment of matrices taken from a number of magazines.

It is the object of my invention to provide a simple and efficient means of separating from one another the different kinds of matrices which make up the assortment and of delivering each to their own magazine, to be there taken care of and distributed in any suitable way. To this end I provide each one of the magazines with its own individual distributer in the usual way, and with these several distributers I combine a selecting device or "selector," as I shall hereinafter term it, to which the line of matrices is first delivered and by which the matrices which belong to one magazine are separated from the others, and each kind of matrix is delivered to its own magazine to be there taken care of and distributed. I thus have a selector which distributes the line of matrices each to its own magazine and in combination therewith individual distributers, one for each magazine, which receive and distribute to their appropriate compartments in their respective magazines the matrices thus assorted and delivered by and from the selector.

To enable those skilled in the art to make and use my improvements, I will now proceed to describe more particularly and in detail and by reference to the drawings accompanying and forming part of this specification the manner in which the same are or may be carried into effect.

In the drawings, Fig. 4 is a left side elevation of the same. Fig. 6 is a side elevation of the same parts on the same enlarged scale. Fig. 7 is a vertical section transverse of the distributers and selectors, designed to show more clearly the manner in which the matrices are distributed by the selector to the several individual distributers. Fig. 10 is a side elevation of the upper portion of the front end of this box, designed to show the side opening or clearance formed in the box at this point to accommodate the elevator or swinging arm that lifts (in the same way as in the ordinary linotype-machine) the line of matrices to the selector. Fig. 11 is an enlarged vertical central section of the reversing-box, designed to show the twist of the bore by which the reversal of the matrices is effected as they pass along through the barrel. Fig. $11^a$ represents the position occupied by a matrix at the entrance of the box. Fig. $11^b$ represents the position it occupies when it has reached the middle of the box. Fig. $11^c$ represents the position it occupies by the time it reaches the far end of the box. Fig. 12 is a sectional detail illustrative of the structure of that portion of the slide for pushing the line of matrices through the reversing-box which is in contact with the last matrix of the line. The shape of this part of the slide is indicated by dotted lines on the face of the matrix in Fig. 9. Fig. 13 is a longitudinal vertical section, on enlarged scale, of the entrance end of the selector, designed to show more clearly the devices by which the selector-screws at each revolution are caused to take one of the matrices. Fig. 14 is a cross-section, partly in elevation, of the same parts. Fig. 15 is a detail view designed to show the cam and lever for controlling the movement of the depressing-finger by which the matresses are successively delivered to the selector-screws.

A is the main frame of the machine. In it are supported a series of superposed magazines (in this instance four in number) $B'$ $B^2$ $B^3$ $B^4$, each of them being of substantially the same construction as the magazine of the commercial Mergenthaler linotype-machine and all of them delivering their matrices through a series of channels to one and the same composing mechanism of the same well-known construction, and the line of matrices after having been set up is conveyed in the usual way to the casting-point and the slug cast therefrom, after which the matrices are taken by the swinging elevator-arm D and carried to the magazine-selector, where a pusher or slide E pushes them in the usual way along and off from the short fixed horizontal ribbed rail $D'$, attached to and carried by the elevator-arm. It is at this point that my invention, in fact, begins, the line of matrices passing from the rail $D'$ into a selector, by which the several kinds of matrices in the line are selected out and delivered each to its appropriate one of the several magazines, there to be taken care of and distributed each to its own channel in that magazine in any known or suitable way. Before proceeding, however, to a description of the distributing means a brief description of the keyboard and connected appliances for selecting and delivering the desired matrix from any one of the plurality of magazines is desirable, although the same form no part of my present invention.

Each magazine is provided with its own set of escapements, one for each channel therein, and all of these escapements are adapted to be operated from one and the same keyboard, for which purpose each escapement is provided with an auxiliary connection, each key is provided with a single main connection, and with these parts is combined means for shifting all the main connections bodily into operative relation with either one of the sets of auxiliary connections to the exclusion of the others. This plan of operating the escapements of any one of the magazines to the exclusion of the others is the subject of my application for Letters Patent filed September 13, 1901, Serial No. 75,325, and the structural details of the mechanism for this purpose herein illustrated are the same as those illustrated and described in my said application. Extended description here of these devices is therefore unnecessary. It is sufficient to say that the escapements proper, G, are similar to those of the commercial Mergenthaler machine, consisting each of a pivoted escapement-lever provided with the two pawls or pins which are projected alternately up through the bottom of the magazine into the channel to which the escapement pertains and with the springs for controlling its movements.

F is the keyboard, and $f$ represents a set of vertical key-bars or reeds, one for each key, which are actuated from the keys in the usual way. These reeds do not, however, connect directly with the escapement-levers G, as in the ordinary Mergenthaler machine, but they are arranged to act upon any one of four sets of auxiliary reeds $f'$ $f^2$ $f^3$ $f^4$, which are supported and spaced in a stationary guide in which they are free to move up and down. The auxiliary reeds $f'$ are connected directly to the escapement-levers G of the lowest magazine $B'$, just as in the ordinary Mergenthaler machine. The auxiliary reeds $f^2$ $f^3$ $f^4$ being farther removed from their escapements are connected thereto by suitable intermediaries consisting of the pivoted levers $f^5$, the connecting-rods $f^6$, and the pivoted levers $f^7$, the connecting-rods of the upper magazines passing between the channels of the magazine or magazines below. The main reeds $f$ can tilt back and forth to be brought in line with either one of the four sets of auxiliary reeds, and for this purpose they move freely through a horizontal guide-comb $f^8$, which is capable of sliding back and forth from front to rear of the machine, and vice versa, and is actuated thus to move by an adjusting-lever $f^9$, pivoted alongside of the keyboard in convenient proximity to the operator and connected through the rods $f^{10}$ $f^{12}$ and intermediate pivoted lever $f^{11}$ to the comb $f^8$. By suitable adjustment of the handle-lever $f^9$ the main reeds $f$ can be brought under either one of the sets of auxiliary reeds, which will thus be operated to the exclusion of the others. These parts, as already stated, are organized and arranged for joint operation, substantially as described and illustrated in my aforesaid application, Serial No. 75,325, and they require no further description here.

I proceed now to describe those portions of the machine in which my present improvements are embodied.

Figure 8:
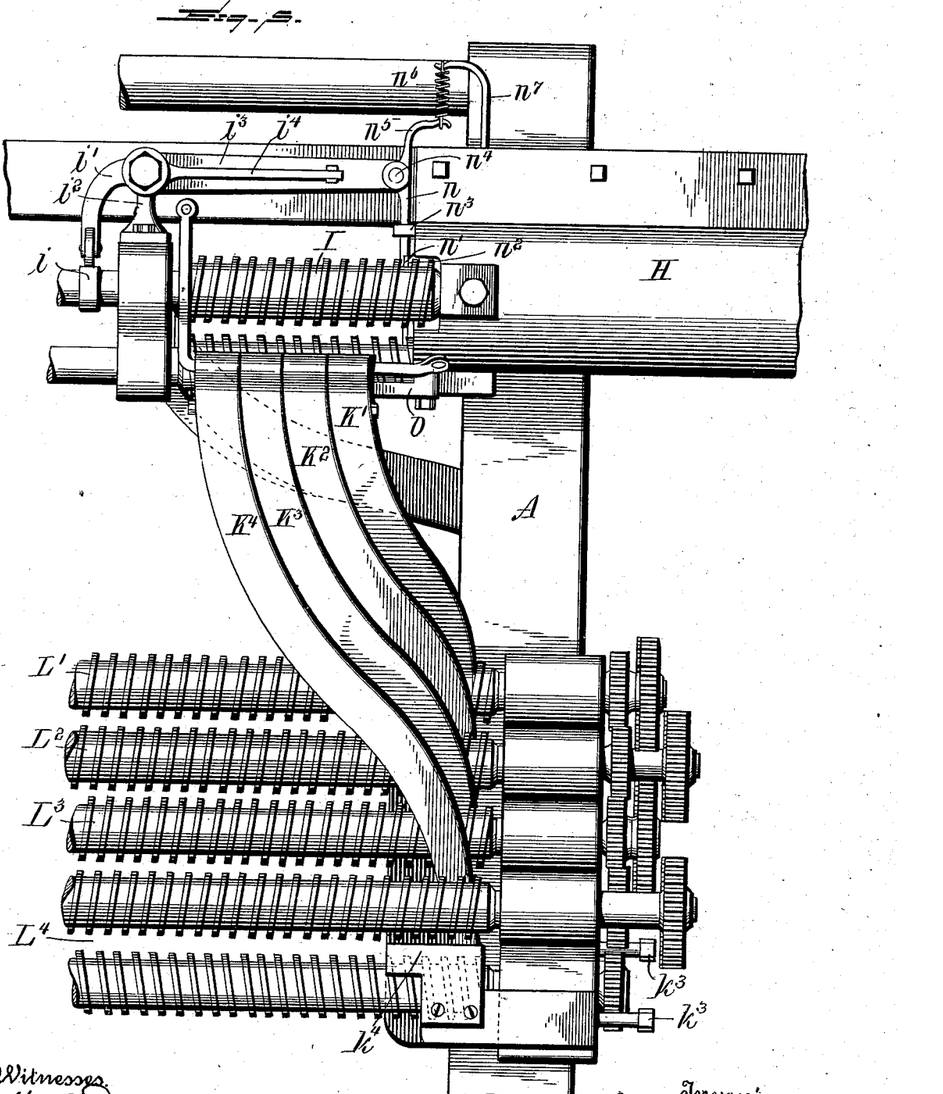
Fig. 8 is a longitudinal central vertical section through the selector, together with a portion of one of the individual distributers below. Fig. $8^a$ is a plan of the selector. Figs. $8^b$, $8^c$, $8^d$, $8^e$ are sections of this selecting-bar, together with elevations of the notched matrices which operate in connection therewith, designed to illustrate the permutations of the ribs and notches for purposes of selecting the matrices for the different magazines, there being in the present instance four magazines, and consequently four different styles or assortments of matrices.

As before said, the several magazines and their individual distributers are combined with a selector, to which the matrices are first conveyed and from which they are delivered each to its appropriate individual magazine-distributer. I prefer to construct the selector on the same general plan as the ordinary linotype-distributer—that is to say, with feed-screws and a selecting-bar with permuted ribs to engage correspondingly-permuted notches or teeth in the matrices. Inasmuch as these matrices are already provided in their tops with permuted notches to engage the distributer-bars of their own individual magazines, it becomes necessary to form elsewhere in them the notches to engage the selecting-bar of the selector. I find it convenient to use the bottom of the matrix for this purpose. This of course necessitates two further things—first, that the matrix shall be turned upside down before it reached the selecting-bar, so that its bottom notches shall be in position to engage the ribs on that bar, and, secondly, that the matrix after having quitted the selecting-bar and before it reaches the individual distributer pertaining to its particular magazine shall be turned again right end uppermost, so that the notches in its top may be in position to engage the individual distributer-bar. For this purpose I employ the box H, in their passage through which the matrices are turned bottom uppermost, the selecting mechanism proper consisting of the feed-screws I and the ribbed selecting-bar J, with permuted ribs which are engaged by the toothed or notched bottoms of the matrices, the latter being correspondingly permuted, so that each matrix as it is pushed along the selecting-bar J shall drop off therefrom at a point over the chute or guideway $K'$, $K^2$, $K^3$, or $K^4$, which leads to the distributer $L'$, $L^2$, $L^3$, or $L^4$ of its appropriate magazine $B'$, $B^2$, $B^3$, or $B^4$, and a device M, located in each chute or guideway (see more particularly Figs. 7 and 8) in the path of the descending matrix and in such position relatively thereto that the matrix by striking it will be caused in its further descent to turn end for end, as indicated by dotted lines in Fig. 7, so as to bring its toothed top again uppermost by the time it reaches its own individual magazine-distributer. These parts are located above the individual distributers and their magazines and are suitably mounted in the framework of the machine, the ribbed rails and feed-screws of all the individual distributers of the selecting mechanism extending from side to side of the machine in substantially parallel planes with one another.

The kind of matrix X employed by me in this connection is shown clearly in Figs. 7, $11^a$, $11^b$, $11^c$. It is of the size and general configuration of the ordinary linotype-matrix, having in its top the customary series of distributing-teeth $x$ for use in connection with the individual distributer of its appropriate magazine. In addition to this it has in its bottom or lower end another series of teeth $y$ for use in connection with the selecting-bar, and, further, (for a purpose hereinafter mentioned,) it has upon its rear face (relatively to its movement through the selector) and extending from the bottom of the V-recess, in the sides of which the teeth $x$ are located, a slot or groove $v$, which tapers or gradually reduces in depth until it merges into the face of the matrix. I remark here that the groove $v$ is not formed in the thinnest matrices, but only in those of greater thickness than the latter, and it varies in depth with the thickness of the matrix. The teeth $y$ in all the matrices belonging to any one of the magazines are the same; but those pertaining to the matrices of the one magazine differ from those of the matrices pertaining to the other magazines, as indicated in Figs. $8^b$, $8^e$, inclusive, and the ribs of the selecting-bar J are correspondingly permuted, as indicated in the same figures.

Figures 9, 20:
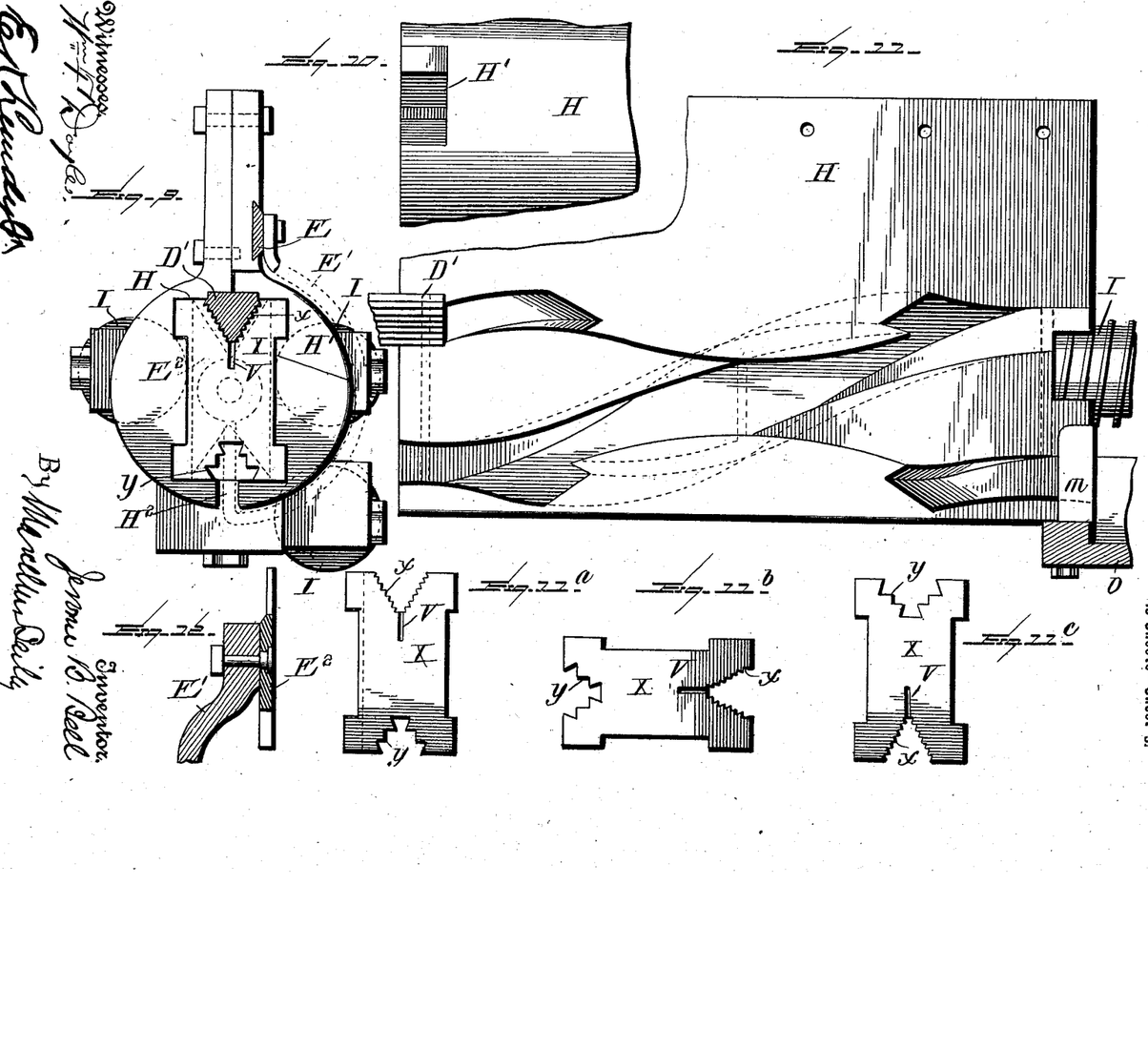
Fig. 9 is an end elevation of the matrix-reversing box which forms part of the selector and is designed to reverse the matrices end for end or turn them upside down before they engage the ribbed selecting-bar shown in Fig. 8.

In the front portion of the reversing-box H is formed the lateral opening or clearance $H'$, Figs. 6, 10, to afford a passage for the front end of the short ribbed rail $D'$, which is attached to and moves with the elevator-arm D in the usual way, and which when said arm is in elevated position is brought into the bore of the reversing-box through this clearance. The line of matrices is pushed off from the rail $D'$ by the slide E, which operates like the similar device in the ordinary linotype-machine to advance the line of matrices to the point where they are taken by the selector-screws; but in thus moving to the selector-screws the line of matrices is pushed through the reversing-box H. The box is tubular, and its longitudinal bore has the configuration in cross-section of the matrix, having a rectangular main portion to receive the body of the matrix and side channels or grooves opening therefrom to receive the four ears of the matrix, as shown clearly in Figs. 9 and 11. This bore is spiral, making a half-turn axially, so that a matrix entering the box top uppermost will have been turned so as to be bottom uppermost by the time it reaches the far end of the box. Figs. 9 and $11^a$ show the position of the matrix as it enters the box, Fig. $11^b$ the position it occupies when it gets half-way through the box, and Fig. $11^c$ the position it occupies by the time it reaches the far end of the box. The slide E has a curved arm $E'$, (shown in dotted lines in Fig. 9,) the lower end of which is bent upward, so as to pass through a longitudinal slot $H^2$ in the reversing-box up into the bore thereof, and on the extremity of this arm is the follower-plate $E^2$, which presses against and advances the matrices. This plate (which has the contour indicated by the dotted lines in Fig. 9) fits the body of the bore in the box H, and it is swiveled or pivoted to the arm $E'$, as indicated in Fig. 12, so that in its movement back and forth through the reversing-box it may turn to follow the twist of the bore therein. Any suitable friction-pad can be provided to prevent the follower-plate from turning too freely. A little beyond the far end of the reversing-box is the horizontal selecting-bar J. With the selecting-bar J are associated the three feed-screws I, which are power-driven and rotate synchronously with each other and also with the various screws of the individual distributers and which are arranged to operate in the same way as the three feed-screws of the ordinary linotype-machine. They are so constructed and arranged that they will engage one of the matrices X at each revolution. For this purpose, as shown more clearly in Figs. 13 and 14, I place in the end of the reversing-box adjoining the selector-screws a vertical central supporting-rib M, over and upon the top edge of which the matrices ride. The rib $m$ is located in the reversing-box just beyond the point where the matrix is completely reversed, so that the central rib $m$ will enter the V-recess in what was the upper end but is now the lower end of the matrix. The front end of the rib $m$ projects forward beyond the end of the reversing-box and a short distance into the space between the selector-screws. Vertically above and in line with the central inclined supporting-rib $m$ is the vertically-reciprocating depressor $n$, which moves up and down between suitable guides $n^3$ and is provided with a shoulder $n'$ and a downwardly-extending finger $n^2$ below the shoulder, Fig. 13. The depressor makes one reciprocation for each revolution of the selector-screws. A convenient mechanism for this purpose consists of a cam $i$, Fig. 15, fast on the shaft of the rear one of the two upper selector-screws I, which acts on the lever-arm $i'$, fulcrumed at $i^2$ to the frame of the machine and connected to another lever-arm $i^3$ (independently hung upon the same fulcrum) by a spring connection $i^4$, Figs. 8, 8ª, through which the arm $i^3$ will be vibrated by the arm $i'$, while at the same time should the movement of the arm be temporarily obstructed for any reason the arm $i'$ could still move, the spring connection $i^4$ yielding for this purpose. To the free end of the arm $i^3$ the depressor $n$ is attached, as seen more plainly in Figs. 8 and 8ª, where it is shown as pivoted at $n^4$ to the arm $i^3$ and provided with an extension or branch $n^5$, which is connected to one end of a spiral spring $n^6$, attached at the other end to a standard $n^7$, fixed to the main frame. The cam $i$ through the intermediate connections just described moves the depressor downward. The spring $n^6$ pulls the depressor upward and at the same time allows it to yield or turn a little on its pivot $n^4$ to accommodate itself to the matrices. The shoulder $n'$ of the depressor rests in the bottom of the V-recess in the adjoining end of the front matrix of the line, with its finger $n^2$ extending down upon the front face of the matrix and forming a stop to restrain its movement in such manner that its shoulder can engage only one matrix at a time. At each descent of the depressor the front matrix of the line is pushed down just at the time its ears will engage the front turns of the screw-threads on the selector-screws, and it brings up at its base against a shelf $o$, so located that it will hold the matrix at just the height requisite to compel it as it is carried forward by the selector-screws to engage the ribs of the selector-bar. This space between the front edge of the central rib $m$ and the contiguous face of the finger $n^2$ is just wide enough to accommodate the thinnest matrix. It is for this reason that the thicker matrices are provided with the tapering central groove $v$, so that, as seen in Fig. 13, the groove at its base will be deep enough to allow the matrix to clear the end of the rib $m$. As the matrix is pushed down, the tapering groove $v$ will pass over the end of the rib $m$ and will act to gradually push the matrix forward enough to allow it to clear the rib, the depressor $n$ yielding for this purpose. In order to assure the line of matrices in position, I affix to the end of the reversing-box stationary guide-lips $p$, Fig. 14, which engage the ears of the front matrix, but only to such an extent as to permit those ears to pass down beyond them as soon as the matrix begins to descend. Their ears restrain the line of matrices in rear (which is pressed forward with yielding pressure by the slide E) from any undue forward movement, and after the depressor again rises its shoulder $n^2$ will snap back into engagement with the matrix, which is then in front. The matrices are thus picked up one by one by the feed-screws I and supported by the shelf $o$ until they are engaged with the selecting-bar J and by the screws carried along the selecting-bar J until they severally reach the points thereon where they will cease to engage the bar and will drop therefrom into their respective chutes or guideways $K'$ $K^2$ $K^3$ $K^4$. In thus dropping they will strike against the reversing-stop M, which is so positioned that it will act to cause the matrix to turn end for end as it descends, so as to bring its toothed top $x$ uppermost again by the time it reaches the distributer below. This is illustrated in Fig. 7, where in one of the chutes one of the matrices is represented in dotted lines above as in the act of turning and in dotted lines below as having completed its turn. Referring now more particularly to Figs. 5 to 8, each chute is of a width and breadth to accommodate comfortably a matrix passing down through it. It is expanded at its mouth or upper end to afford room for the matrix to turn end for end and then contracts as it extends downward in order to prevent another turn of the matrix and also to guide it properly between the distributer-screws.

The reversing-stop M may conveniently consist, as shown, of a horizontal rod, which extends crosswise through all the chutes and is preferably covered with a rubber sleeve to prevent damage to the falling matrices as they strike against it.

In the arrangement shown in the drawings each chute delivers its matrices directly to the feed-screws of the individual distributer $L'$ $L^2$ $L^3$ $L^4$ with which it is associated, and for this reason it is necessary that the delivery end of the chute should be accurately positioned with reference to the threads of the feed-screws and that there should be capacity for adjustment of the delivery end of the chute in case its normal relation to the feed-screws should be disturbed. To this end the inner and outer walls $k\ k'$ of the delivery end of each chute projects down between without contacting with the feed-screws of its individual distributer. The inner wall $k$ is V-shaped at its lower end and is short enough to allow the matrix to be carried along under it by the feed-screws. The outer wall $k'$ is prolonged downward and is attached to a block $k^2$, the top of which forms the floor upon which the base of the descending matrix rests, the floor being of such height that when the matrix brings up against it its ears will engage the threads of the three feed-screws, as indicated in Fig. 7. As the matrix is carried forward by the feed-screws out from under the front wall $k$ of the chute its top ears pass up over inclined rails $l\ l$, and the matrix is thus as it travels along raised to a position where it will engage the ribs of the individual distributer-bar (not shown) which is associated with each set of feed-screws in the usual way and is similar to that found in the ordinary linotype-machine. In order to adjust the delivery end of the chute with reference to the intervals between the threads of the feed-screws, so that when the matrix descends its ears shall enter those intervals, the block $k^2$ (to which the outer wall $k'$ of the chute is attached) is made adjustable lengthwise of the screws by means of an adjusting-screw $k^3$. A slight movement only of the block is required for this purpose, and the chute is so mounted that its lower end can have the slight play requisite to permit it to move with the block. The rails $l\ l$ partake also of this movement of adjustment, for which purpose they are attached to the block $k^2$, the one by a plate $k^4$, Fig. 7, and the other by a bracket $k^5$. These devices for delivering the matrices from the chute to the distributer feed-screws are, however, not here claimed. They form part of the subject-matter of my prior application, Serial No. 75,325, hereinbefore referred to, wherein they are fully described and illustrated.

Figure 1:
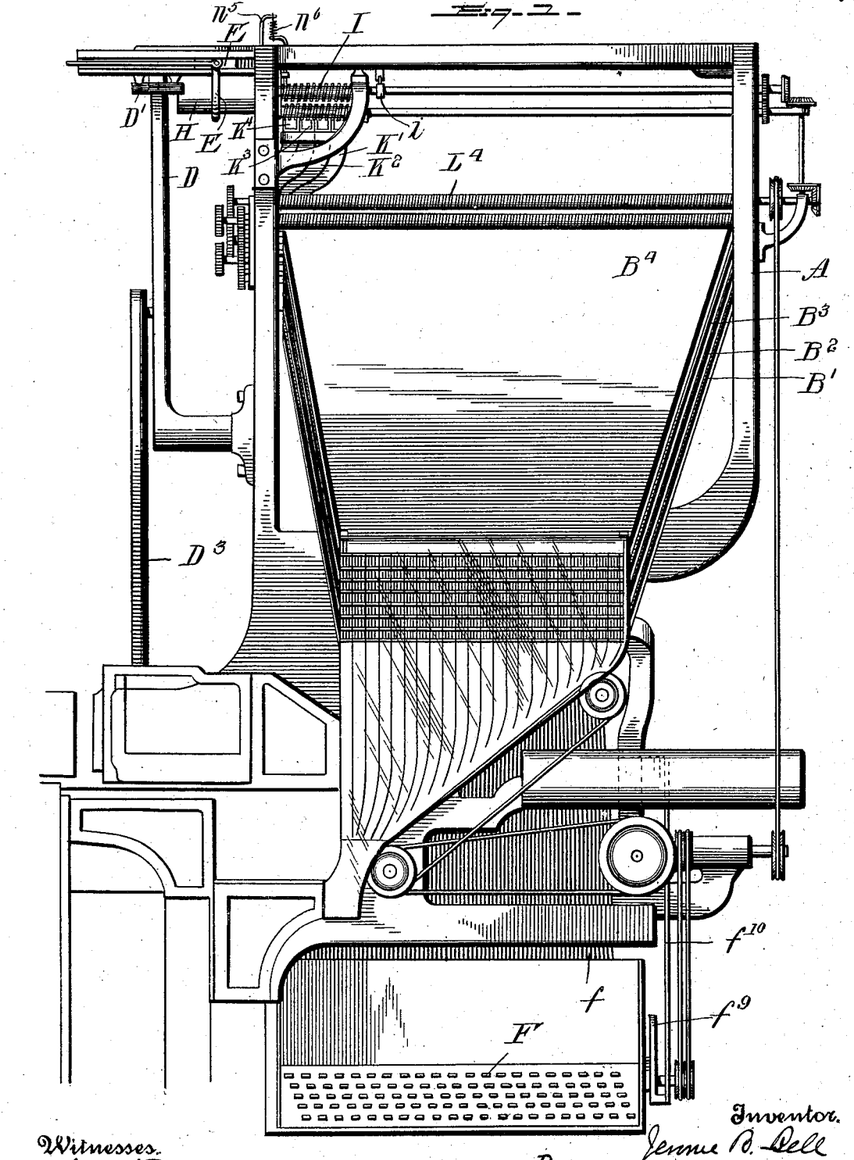
Figure 1 is a front elevation of so much of a linotype-machine embodying my improvements as is required for the purposes of explanation.
Figure 2:
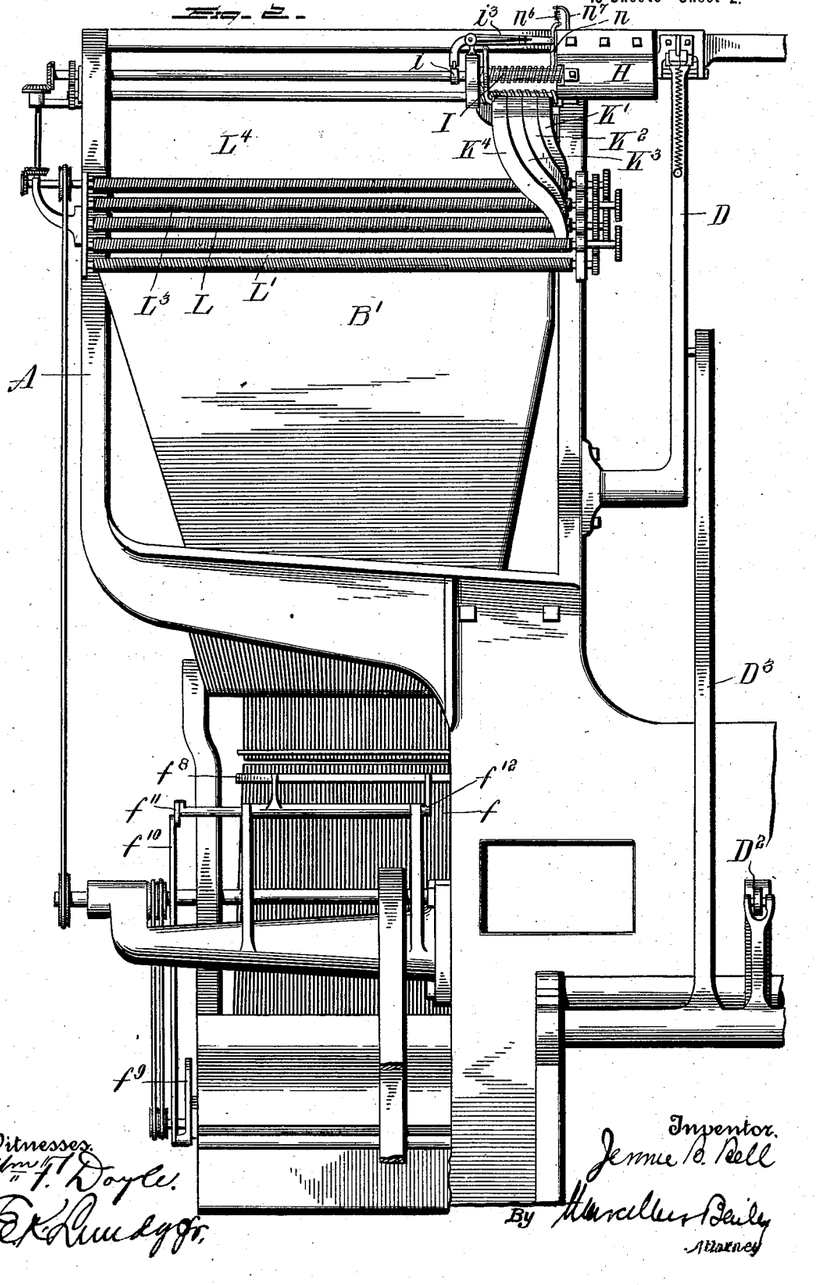
Fig. 2 is a rear elevation of the same.
Figures 2, 2A, 2B, 2C, 2D, 2E:
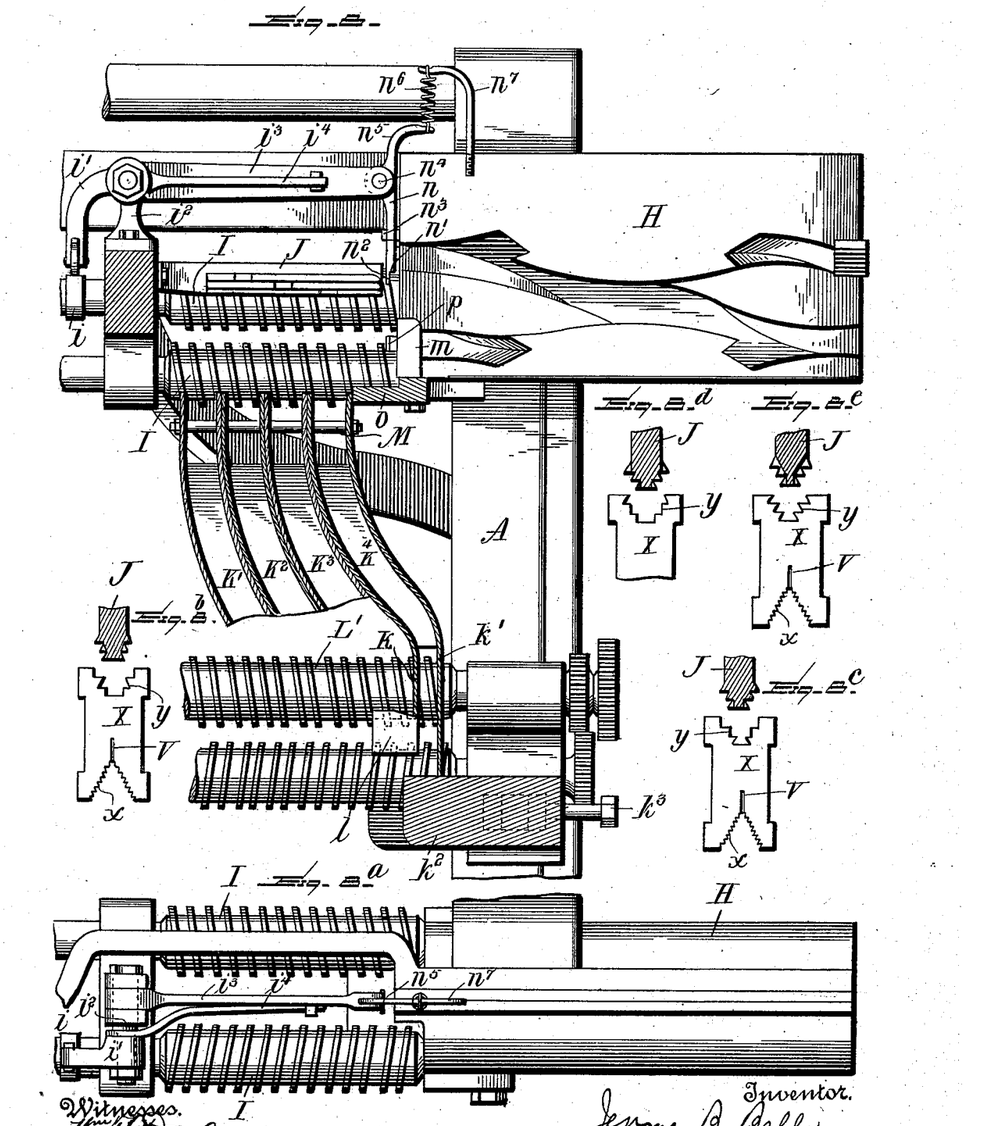
Figure 3:
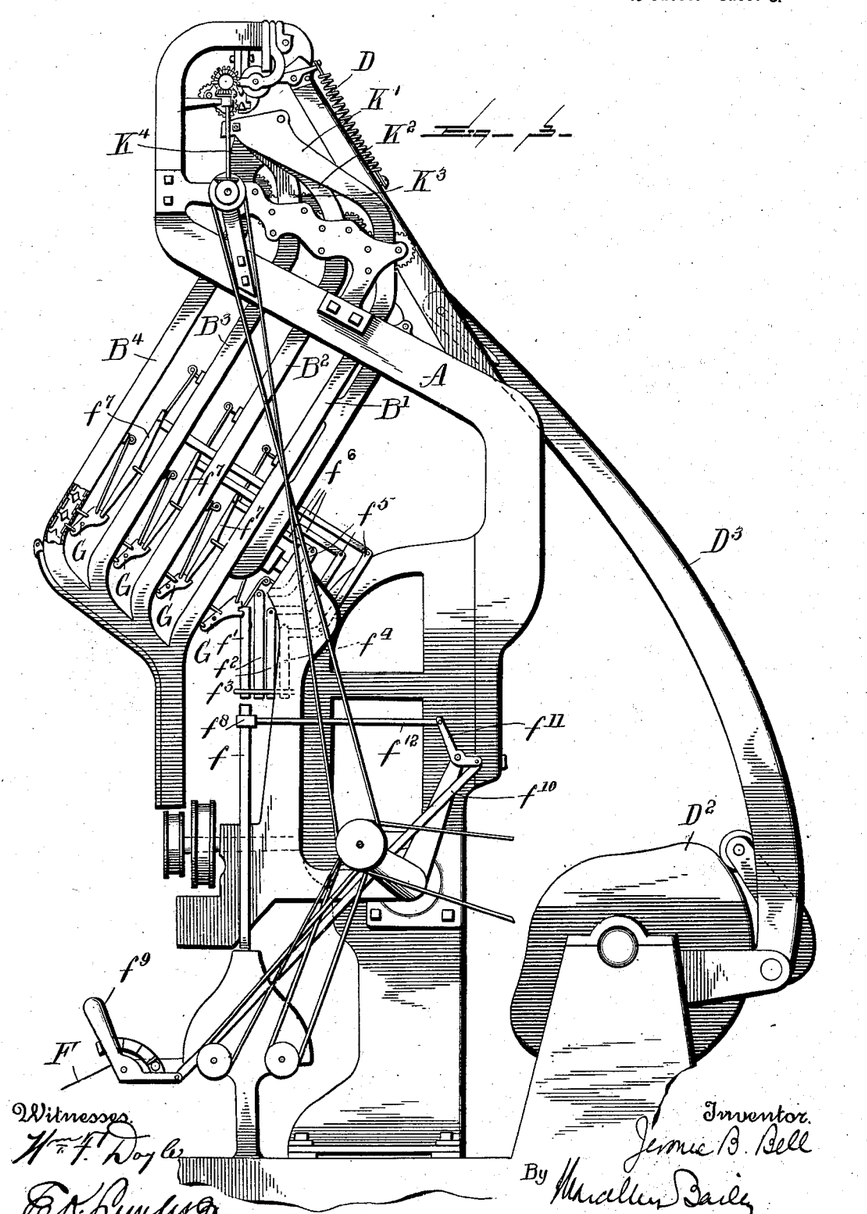
Fig. 3 is a right side elevation of the same.
Figure 5:
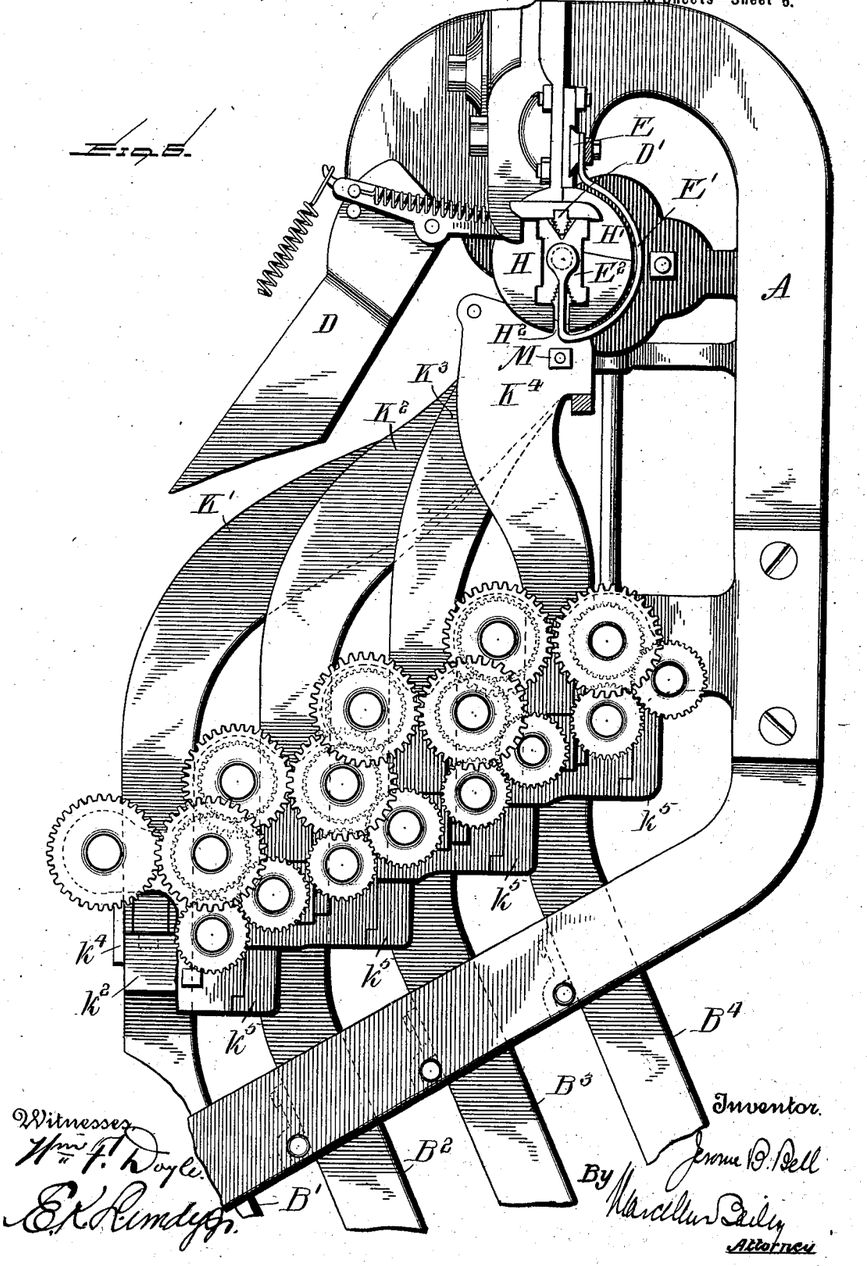
Fig. 5 is a rear elevation, on enlarged scale, of the upper portion of the machine at the end where the selector is located, showing said selector and the delivery-channels leading from the same to the several individual distributers.

The feed-screws of all the individual distributers, as well as those of the selectors, are positively geared together, as shown clearly in Figs. 1, 5, 6, so that they are all revolved together and in unison.

The swinging elevator-arm D gets its movement from a cam $D^2$, Fig. 4, like that in the ordinary linotype-machine; but owing to the change in location of the arm D made necessary in order to enable it to operate in connection with the selector (which is located above the point where the distributer is located in the ordinary linotype-machine) I actuate the elevator-arm from the cam through the intermediary of a pivoted rod or bar $D^3$, which at its upper end has a pin-and-slot connection with the elevator-arm, as shown.

I remark that the receiving-box H can be usefully associated and used in combination with a one-magazine machine, in which case it would be interposed between the elevator and the ribbed bar of the distributer of that magazine, just as it is here interposed between the elevator and the ribbed distributing-bar of the selector. The box would have as now a bore conforming in shape to the matrix; but that bore would not be rifled or twisted, but would be straight from end to end, so as to deliver the matrix to the distributer-bar without turning it upside down. I also remark that whether the bore be twisted or not the side channels or grooves for receiving the ears may be dispensed with, and the box can be made of rectangular cross-section of an area to receive the ears as well as the body of the matrix.

Having now described my improvements and the best way now known to me of carrying the same into practical effect, I state in conclusion that I do not restrict myself narrowly to the structural details of the mechanism and devices in which said improvements are embodied, for manifestly the same can be considerably varied without departure from the spirit of the invention; but

What I claim herein as new, and desire to secure by Letters Patent, is as follows:

1. In a linotype-machine a plurality of superposed magazines each adapted to receive a full assortment of the characters used in the machine, and an individual distributer having a ribbed bar and feed-screws for each magazine, in combination with a selector having a ribbed bar and feed-screws located above the individual distributers, a separate chute or matrix passage-way from the selector to each individual distributer, matrices having two sets of permuted teeth, the one to engage the selector-bar and the other to engage the appropriate individual distributer-bar, and means for delivering a line of said matrices to the selector, substantially as and for the purposes hereinbefore set forth.

2. In a linotype-machine, a plurality of magazines and an individual distributer for each magazine, in combination with ribbed selector-bar and feed-screws for separating out the matrices of each magazine from those of the others, matrices having at the top a permuted set of teeth to engage the ribbed bar of its appropriate individual distributer, and at the bottom a permuted set of teeth to engage the ribbed selector-bar, means for delivering a line of such matrices to the selector-bar, and for conducting the same from said selector-bar each to its own individual distributer, means for turning the matrices upside down, before they engage the main selector-bar, and means for turning the matrices end for end so as to bring them again top uppermost after they leave the selector-bar and before they reach their appropriate individual distributers, substantially as and for the purposes hereinbefore set forth.

3. In combination with the selector-bar and feed-screws, the receiving-box having a rifled or twisted bore, and means for delivering matrices to and pushing them through said box, substantially as and for the purposes hereinbefore set forth.

4. In a linotype-machine the combination with a ribbed distributer-bar and feed-screws and an elevator and pusher for delivering a line of matrices thereto, of an interposed receiving-box formed to receive the matrices as they are pushed from the elevator, a central supporting-rib $m$, a vertically-reciprocating depressor which pushes downward the front matrix of the line into a position to be taken by the feed-screws, and a shelf for arresting the descent of the matrix at a point where it will be in position as it is advanced by the feed-screws, to engage the ribbed distributer-bar, substantially as and for the purposes hereinbefore set forth.

5. The combination with the selector-screws and means for delivering a line of matrices thereto at a level above that at which they will engage the feed-screws, of a vertically-reciprocating depressor for pushing down the matrices successively into position to be taken by the selector-screws, and actuating mechanism for said depressor, substantially as and for the purposes hereinbefore set forth.

In testimony whereof I have hereunto set my hand this 8th day of November, 1901.

JEROME B. BELL.

Witnesses:
 EWELL A. DICK,
 E. K. LUNDY, Jr.